United States Patent
Dalsgaard et al.

(10) Patent No.: US 9,516,534 B2
(45) Date of Patent: Dec. 6, 2016

(54) REFERENCE SIGNAL RECEIVED QUALITY MEASUREMENT BANDWIDTH ADAPTION

(71) Applicant: Nokia Corporation, Espoo (FI)

(72) Inventors: Lars Dalsgaard, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/411,622

(22) PCT Filed: Aug. 12, 2013

(86) PCT No.: PCT/FI2013/050792
§ 371 (c)(1),
(2) Date: Dec. 29, 2014

(87) PCT Pub. No.: WO2014/023878
PCT Pub. Date: Feb. 13, 2014

(65) Prior Publication Data
US 2015/0172947 A1  Jun. 18, 2015

Related U.S. Application Data

(60) Provisional application No. 61/682,073, filed on Aug. 10, 2012.

(51) Int. Cl.
| H04L 12/26 | (2006.01) |
| H04W 24/10 | (2009.01) |
| H04W 24/00 | (2009.01) |
| H04W 36/00 | (2009.01) |

(52) U.S. Cl.
CPC ............ *H04W 24/10* (2013.01); *H04W 24/00* (2013.01); *H04W 36/0094* (2013.01)

(58) Field of Classification Search
CPC ..................................................... H04W 24/10
USPC ................................................. 370/310–350
See application file for complete search history.

(56) References Cited

U.S. PATENT DOCUMENTS

| 2011/0110251 A1 | 5/2011 | Krishnamurthy et al. |
| 2013/0094381 A1* | 4/2013 | Han ...................... H04W 24/10 370/252 |

FOREIGN PATENT DOCUMENTS

| WO | 2007124696 A1 | 11/2007 |
| WO | 2011029473 A1 | 3/2011 |
| WO | 2011098049 A1 | 8/2011 |

OTHER PUBLICATIONS

International Search Report and Written Opinion received for corresponding Patent Cooperation Treaty Application No. PCT/FI2013/050792, dated Nov. 14, 2013, 12 pages.
"RSRQ Measurement Over Wide Measurement Bandwidth", 3GPP TSG RAN WG4 Meeting #63, R4-122639, Agenda Item: 4.2.3, Ericsson, May 21-25, 2012, pp. 1-4.

(Continued)

*Primary Examiner* — Ricky Ngo
*Assistant Examiner* — Wei-Po Kao
(74) *Attorney, Agent, or Firm* — Nokia Technologies Oy

(57) ABSTRACT

Various communication systems may benefit from appropriate bandwidth selection for interference measurements. For example, evolved universal mobile telecommunication system (UMTS) radio access network (E-UTRAN) systems may benefit from reference signal received quality (RSRQ) measurement configurations that take into account an identified need.

11 Claims, 3 Drawing Sheets

(56) References Cited

OTHER PUBLICATIONS

"Issues on Narrow Measurement Bandwidth", TSG-RAN Working Group 4 Meeting #60, R4-114243, Agenda item: 6.1.3, Ntt Docomo, Aug. 22-26, 2011, 5 pages.
"Way Forward on RSRQ Measurement Bandwidth", 3GPP TSG-RAN WG4 Meeting #62bis, R4-122205, Agenda Item: 4.2.3, Renesas Mobile Europe, Mar. 26-30, 2012, 3 pages.
"3rd Generation Partnership Project; Technical Specification Group Radio Access Network; Evolved Universal Terrestrial Radio Access (E-UTRA); Radio Resource Control (RRC);Protocol specification (Release 11)", 3GPP TS 36.331, V11.0.0, Jun. 2012, pp. 1-302.
"Wideband RRM Measurements", 3GPP TSG-RAN WG4 #63, R4-122811, Agenda item: 6.1.3, Qualcomm Incorporated, 2012, pp. 1-3.
"Simulation Results and Some Considerations on RSRQ Measurement Bandwidth", 3GPP TSG-RAN WG4 Meeting #62bis, R4-122542, Agenda Item: 6.1.3, ZTE, May 21-25, 2012, 4 pages.
"Comprehensive Solution for the Issue of RSRQ Measurement BW", 3GPP TSG-RAN WG4 meeting #63, R4-122524, Agenda item: 6.1.3, Ntt Docomo, May 21-25, 2012, 4 pages.
"Aspects Related to RSRQ Measurement Over Wide Measurement Bandwidth", 3GPP TSG RAN WG4 Meeting #64, R4-124276, Agenda Item: 4.2.3, Ericsson, pp. 1-4.
"Further Considerations on RSRQ Measurement Bandwidth", 3GPP TSG-RAN WG4 Meeting #64, R4-124515, Agenda item: 4.2.3, Renesas Mobile Europe Ltd, Aug. 13-17, 2012, 7 pages.
"3rd Generation Partnership Project; Technical Specification Group Radio Access Network; Evolved Universal Terrestrial Radio Access (E-UTRA); Requirements for support of radio resource management (Release 11)", 3GPP TS 36.133, V11.1.0, Jun. 2012, pp. 1-652.
"Considerations on RSRQ Measurement Bandwidth", 3GPP TSG-RAN4 #63 UE performance AH, R4-63AH-0183, Agenda item: 9, Nokia Corporation, Jun. 26-28, 2012, 6 pages.
"Draft LS to RAN2 on Wideband RSRQ Measurement", 3GPP TSG-RAN WG4 Meeting #64bis, R4-126013, Oct. 8-12, 2012, 2 pages.
"Consideration on RSRQ Measurement BW", 3GPP TSG-RAN WG4 Meeting #62bis, R4-121794, Agenda item: 6.1.3, Nokia Corporation, Mar. 26-30, 2012, 7 pages.
"Considerations on RSRQ Measurement Bandwidth", 3GPP TSG-RAN WG4 Meeting #62Bis, R4-121461, Agenda Item: 6.1.3, Samsung, Mar. 26-30, 2012, 3 pages.
"Further Considerations on RSRQ Measurement Bandwidth", 3GPP TSG-RAN4 #64, R4-124623, Agenda item: 6.1.3, Nokia Corporation, Aug. 13-17, 2012, 7 pages.
U.S. Appl. No. 61/649,840, "Signal Quality Measurements", filed May 21, 2012, 26 pages.
"Introducion of Wideband RSRQ Measurements", 3GPP TSG-RAN WG2 Meeting #80, R2-125862, Ntt Docomo, Nov. 12-16, 2012, 3 pages.
"Introduction of wideband RSRQ measurements", 3GPP TSG-RAN WG2 Meeting #80, R2-125863, Ntt Docomo, Nov. 12-16, 2012, 12 pages.
"Introduction of Wideband RSRQ Measurements", 3GPP TSG-RAN WG2 #80, R2-125661, Agenda Item: 5.3.1, Ntt Docomo, Nov. 12-16, 2012, 3 pages.
"Discussion on Wider Bandwidth RSRQ Measurement", 3GPP TSG-RAN WG2#80 meeting, R2-125784, Agenda item. 5.3.1, Huawei, Nov. 12-16, 2012, 3 pages.
"Introducion of Wideband RSRQ Measurements", 3GPP TSG-RAN WG2 Meeting #80, R2-125664, Ntt Docomo, Nov. 12-16, 2012, 3 pages.
"3rd Generation Partnership Project; Technical Specification Group Radio Access Network; Evolved Universal Terrestrial Radio Access (E-UTRA); LTE physical layer; General description(Release 11)", 3GPP TS 36.201, V11.1.0, Dec. 2012, pp. 1-13.
"3rd Generation Partnership Project;Technical Specification Group Radio Access Network;Evolved Universal Terrestrial Radio Access (E-UTRA);Physical Channels and Modulation(Release 11)", 3GPP TS 36.211, V11.1.0, Dec. 2012, pp. 1-108.
"3rd Generation Partnership Project; Technical Specification Group Radio Access Network; Evolved Universal Terrestrial Radio Access (E-UTRA); Multiplexing and channel coding(Release 11)", 3GPP TS 36.212, V11.1.0, Dec. 2012, pp. 1-82.
"3rd Generation Partnership Project; Technical Specification Group Radio Access Network; Evolved Universal Terrestrial Radio Access (E-UTRA); Physical layer procedures(Release 11)", 3GPP TS 36.213, V11.1.0, Dec. 2012, pp. 1-160.
"3rd Generation Partnership Project; Technical Specification Group Radio Access Network; Evolved Universal Terrestrial Radio Access (E-UTRA); Physical layer, Measurements(Release 11)", 3GPP TS 36.214, V11.1.0, Dec. 2012, pp. 1-14.
Non-Final Office action received for corresponding U.S. Appl. No. 13/782,970, dated Jul. 22, 2014, 11 pages.
Final Office action received for corresponding U.S. Appl. No. 13/782,970, dated Oct. 29, 2014, 12 pages.
Extended European Search Report received for corresponding European Patent Application No. 13828285.0, dated Jun. 20, 2016, 10 pages.
"Considerations on RSRQ Measurement Bandwidth", 3GPP TSG-RAN WG4 Meeting 63# UE performance AH, R4-63AH-0152, Agenda item: 9, Samsung, Jun. 26-28, 2012, 3 pages.
"Consideration on RSRQ Measurement Bandwidth", 3GPP TSG-RAN WG4 (Radio) Meeting #64, R4-124335, Agenda Item: 6 1.3, Research in Motion UK Limited, Aug. 13-17, 2012, 2 pages.
"Considerations on RSRQ Measurement Bandwidth", 3GPP TSG-RAN WG4 Meeting #62Bis, R4-122484, Agenda Item: 6.1.3, Samsung, May 21-25, 2012, 3 pages.

* cited by examiner

REFERENCE SIGNAL RECEIVED QUALITY MEASUREMENT BANDWIDTH ADAPTION

RELATED APPLICATION

This application was originally filed as Patent Cooperation Treaty Application No. PCT/FI2013/050792 filed Aug. 12, 2013 which claims priority benefit to U.S. Provisional Patent Application No. 61/682,073, filed Aug. 10, 2012.

CROSS-REFERENCE TO RELATED APPLICATION

This application is related to and claims the priority of U.S. Provisional Patent Application No. 61/682,073, which was filed Aug. 10, 2012, and which is hereby incorporated herein by reference in its entirety.

BACKGROUND

Field

Various communication systems may benefit from appropriate bandwidth selection for interference measurements. For example, evolved universal mobile telecommunication system (UMTS) radio access network (E-UTRAN) systems may benefit from reference signal received quality (RSRQ) measurement configurations that take into account an identified need.

Description of the Related Art

When, for example, a 10 MHz long term evolution (LTE) cell is overlapping 5+5 MHz wideband code division multiple access (WCDMA) cells, such as two single carrier WCDMA cells or a dual carrier high speed packet access (HSPA), and reference signal received quality (RSRQ) measurements are carried out over the central seventy-two subcarriers, six resource blocks (RBs), this particular measurement would be carried out in a guard band between the two WCDMA cells. Consequently, the RSRQ would be overestimated, and because RSRQ is used for handover decisions, the mobility functionality of the system may also be affected.

Various approaches may be provided for addressing this situation. For example, complex approaches including new signaling elements may be used to try to require the UE, under certain given conditions, to perform RSRQ measurements over a wider bandwidth as compared to current minimum requirement of six physical resource blocks (6PRBs).

Current specifications only require a user equipment to perform measurements over the six center PRBs, seventy-two subcarriers, in E-UTRAN for both intra-frequency (intra-F) measurements and inter-frequency (inter-F) measurements.

Third generation partnership project (3GPP) technical specification (TS) 36.331, which is hereby incorporated herein by reference in its entirety, includes an option for the network to indicate the bandwidth of configured carriers using the 'allowedMeasBandwidth' parameter. This option is used to be able to restrict the 'maximum' measurement bandwidth (BW) potentially used by the UE in case the UE chooses to perform measurements on wider bandwidth than required. Thus, the parameter indicates maximum bandwidth that can be used on the indicated carrier frequency and UE is not allowed to use wider measurement BW than indicated by 'allowedMeasBandwidth' parameter.

Thus, in general, the UE may choose to perform measurements of detected cells using wider bandwidth than the minimum requirement of six PRBs, but is not required to do so. Additionally, the bandwidth used is conventionally not allowed to exceed the indicated 'AllowedMeasBandwidth'.

BRIEF DESCRIPTION OF THE DRAWINGS

For proper understanding of the invention, reference should be made to the accompanying drawings, wherein.

DETAILED DESCRIPTION

Certain embodiments provide for a user equipment (UE) to perform bandwidth measurement from a range with a wider minimum measurement bandwidth based on the fact that the parameter 'allowedMeasBandwidth', which generally indicates a maximum allowed measurement bandwidth, has been signaled to UE. The UE can adjust its measurement bandwidth for the purposes of reference signal strength indicator (RSSI), reference signal received power (RSRP) or reference signal received quality (RSRQ) within the range of the minimum measurement bandwidth and the allowed measurement bandwidth.

In certain embodiments, re-use of existing signaling is performed using new interpretation. For example, if an 'allowedMeasBandwidth' parameter exceeds certain set threshold, the UE can apply a wider minimum bandwidth. As such, the range within which the UE may select a measurement bandwidth is narrowed from the existing minimum measurement bandwidth (BW) of six PRBs to the wider minimum bandwidth. The maximum of the range is in this embodiment maintained as the value indicated by the 'allowedMeasBandwidth' parameter.

On the other hand, if the 'allowedMeasBandwidth' parameter is lower than the given decision threshold, the UE is not required to use a wider measurement bandwidth than the existing minimum measurement bandwidth (BW) of six PRBs.

If the 'allowedMeasBandwidth' parameter exceeds the given decision threshold, the UE can be required to use a wider measurement bandwidth, namely more than six PRBs, but without a specific requirement with respect to the bandwidth.

The decision threshold for the UE can be set in various ways. For example, the decision threshold for the 'allowedMeasBandwidth' parameter could be fixed in a protocol specification, for example, by giving table in which used measurement BW is dependent on the 'allowedMeasBandwidth' parameter or by otherwise defining a fixed relationship between the threshold and the received allowedMeasBandwidth. Alternatively, the decision threshold could be signaled by the network. Such signaling may be special purpose signaling for communicating the decision threshold. In another alternative, there can be multiple thresholds, to have a wider variability in the used measurement BW.

Moreover, the above method can be combined with other triggers, such as network (NW) indication, cell detection, or the like. In general, another parameter than allowedMeasBandwidth may be used to derive the minimum measurement bandwidth that a UE may select from. For example, the serving cell bandwidth may be used.

Certain embodiments can be implemented in which the UE is autonomous, with its decisions determined by a technical specification. In other embodiments, the adaptation of measurement bandwidth can be network (NW) controlled.

Certain embodiments do not require any new signaling support. These embodiments, therefore, may enable faster support from UEs in an early phase. This early phase support may be done in a release independent manner.

Figure 1:
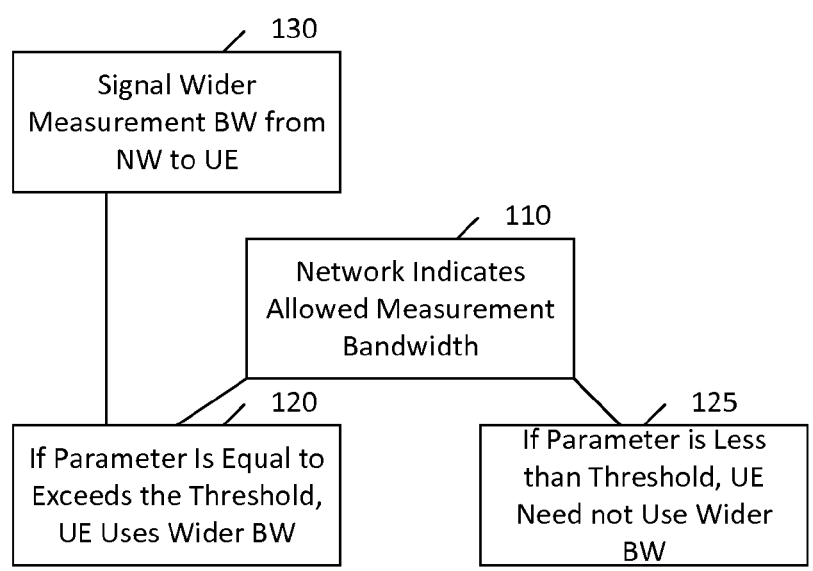
FIG. 1 illustrates a method according to certain embodiments.

FIG. 1 illustrates a method according to certain embodiments. As shown in FIG. 1, at 110, a network can indicate, in the measurement configuration sent to the UE, the allowed measurement bandwidth in allowedMeaBandwitdth information element (IE).

At 120, if the 'allowedMeasBandwidth' parameter is equal to or exceeds the decision threshold for applying wider bandwidth (BW) measurements, the UE can use defined wider measurement bandwidth for the mobility measurement, such as RSRQ. The decision threshold could be signaled by the network (NW) or could be fixed in specification.

The wider measurement BW could also be determined through requirements or given by the NW, at 130. The 'allowedMeasBandwidth' parameter can be replaced with the serving cell bandwidth.

At 125, if the 'allowedMeasBandwidth' parameter is lower than the given decision threshold, then UE is not mandated to use wider measurement bandwidth for the chosen mobility measurement.

The need for new signaling support can be avoided by defining the UE behavior based on the existing signaling element 'allowedMeasBandwidth,' as described in 3GPP TS 36.133, which is hereby incorporated herein by reference in its entirety. This UE behavior can based on a threshold of the indicated 'allowedMeasBandwidth.' The threshold can be defined in the specification based, for example, on simulation results showing for which bandwidth(s) it would be beneficial to apply wider bandwidth measurement.

Certain embodiments provide a simple implementation that permits the use of wider measurement bandwidth on a need basis. Moreover, certain embodiments enable network control of when a user equipment is to apply wider bandwidth measurements.

Certain embodiments do not require wideband RSRQ measurements in all cases. Moreover, certain embodiments may have minimal impact on the user equipment. Certain embodiments, furthermore, can be applied without any signaling support for early deployment in user equipment, but can be improved by having signaling support, such as a network indication.

Additionally, in certain embodiments the network is unable to misuse the feature and request wider bandwidth measurements from UE continuously under all circumstances but only when actual bandwidth is larger than the given threshold.

Figure 2:
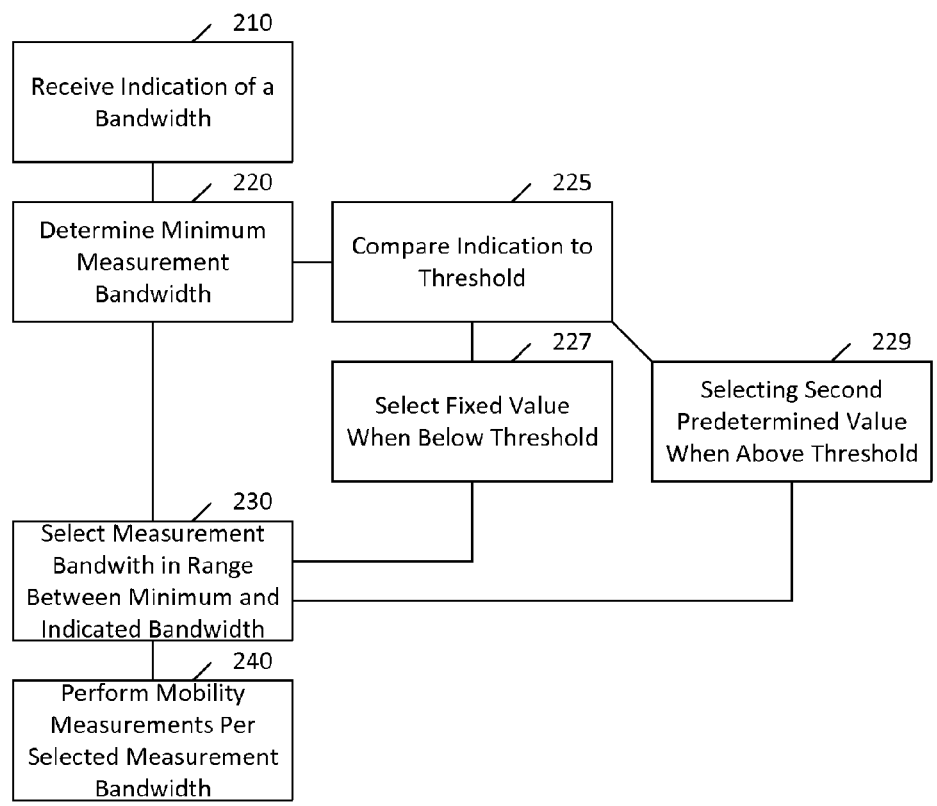
FIG. 2 illustrates another method according to certain embodiments.

FIG. 2 illustrates a method according to certain embodiments. The method includes, at 210, receiving an indication of a bandwidth. The indicated bandwidth can be an allowed measurement bandwidth or a serving cell bandwidth. Specifically, the indicated bandwidth can nominally be a maximum measurement bandwidth, which the user equipment can interpret differently.

At 220, the method includes determining a minimum measurement bandwidth in dependence of the indicated bandwidth. The method can also include, at 225, comparing the indicated bandwidth to a threshold, which can be a predetermined value. The predetermined value can be received over an air interface.

The determining can include, at 227, selecting, as the determined minimum measurement bandwidth, a fixed value when the indicated bandwidth is below a predetermined value. The determining can include, at 229, selecting, as the determined minimum measurement bandwidth, a second predetermined value when the indicated bandwidth is above the predetermined value. The second predetermined value can be received over an air interface.

The method can also include, at 230, selecting a measurement bandwidth in the range between the minimum measurement bandwidth and the indicated bandwidth. The method can further include, at 240, performing mobility measurements in accordance with the selected measurement bandwidth.

Figure 3:
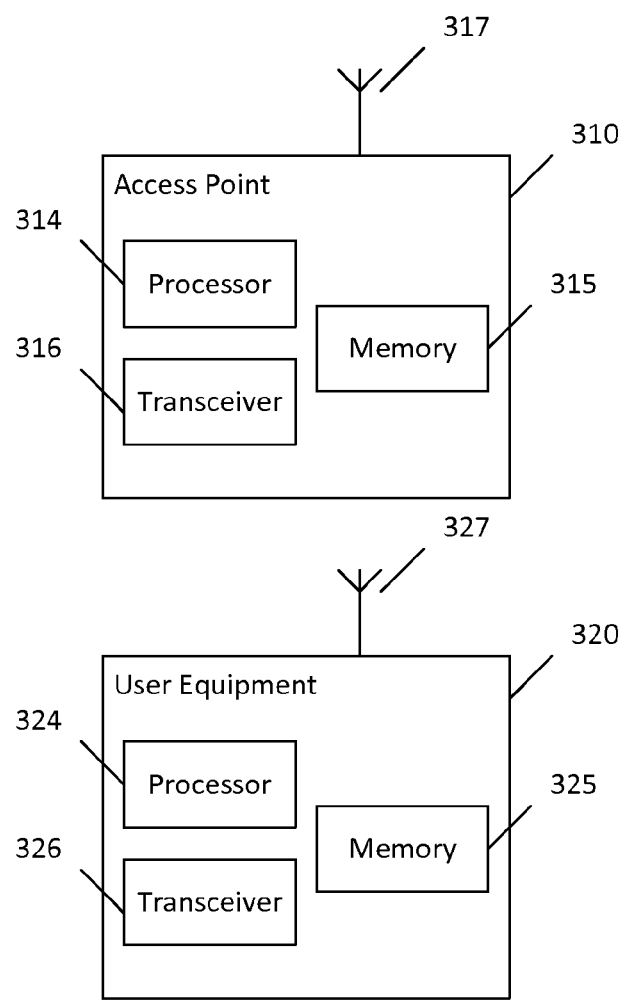
FIG. 3 illustrates a system according to certain embodiments.

FIG. 3 illustrates a system according to certain embodiments of the invention. In one embodiment, a system may comprise several devices, such as, for example, access point 310 and UE 320. The system may comprise more than one UE 320 and more than one access point 310, although only one of each is shown for the purposes of illustration. The system may also involve only at least two UEs 320 or only at least two access points 310. An access point can be a base station, eNode B (eNB) or other network access element. Each of these devices may comprise at least one processor, respectively indicated as 314 and 324. At least one memory may be provided in each device, and indicated as 315 and 325, respectively. The memory may comprise computer program instructions or computer code contained therein. One or more transceiver 316 and 326 may be provided, and each device may also comprise an antenna, respectively illustrated as 317 and 327. Although only one antenna each is shown, many antennas and multiple antenna elements may be provided to each of the devices. Other configurations of these devices, for example, may be provided. For example, access point 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception.

Processors 314 and 324 may be embodied by any computational or data processing device, such as a central processing unit (CPU), application specific integrated circuit (ASIC), or comparable device. The processors may be implemented as a single controller, or a plurality of controllers or processors.

Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 310 and UE 320, to perform any of the processes described above (see, for example, FIGS. 1 and 2). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 3 illustrates a system including an access point 310 and a UE 320, embodiments of the invention may be applicable to other configurations, and configurations involving additional elements, as illustrated and discussed herein. For example, multiple user equipment devices and multiple access points may be present, or other nodes providing similar functionality, such as relays which may receive data from an access point and forward the data to a UE and may implement both functionality of the UE and functionality of the access point.

According to a first embodiment, a method includes receiving an indication of a bandwidth. The method also includes determining a minimum measurement bandwidth in dependence of the indicated bandwidth. The method can further include selecting a measurement bandwidth in the range between the minimum measurement bandwidth and the indicated bandwidth. The method can additionally include performing mobility measurements in accordance with the selected measurement bandwidth.

The indicated bandwidth can be an allowed measurement bandwidth or a serving cell bandwidth.

The determined minimum measurement bandwidth can be a fixed value when the indicated bandwidth is below a predetermined value.

The predetermined value can be received over an air interface.

The determined minimum measurement bandwidth can be a second predetermined value when the indicated bandwidth is above the predetermined value.

The second predetermined value can be received over an air interface.

The above optional variants on the first embodiment can be implemented individually or in combination with one another.

According to a second embodiment, a non-transitory computer readable medium is encoded with instructions that, when executed in hardware, perform a process. The process includes the method of the first embodiment, in any of its variants.

According to a third embodiment, an apparatus includes at least one processor and at least one memory including computer program code. The at least one memory and the computer program code are configured to, with the at least one processor, cause the apparatus at least to perform a process. The process includes method of the first embodiment in any of its variants.

According to a fourth embodiment, an apparatus includes receiving means for receiving an indication of a bandwidth. The apparatus also includes determining means for determining a minimum measurement bandwidth in dependence of the indicated bandwidth. The apparatus can further include selecting means for selecting a measurement bandwidth in the range between the minimum measurement bandwidth and the indicated bandwidth. The apparatus can additionally include measuring means for performing mobility measurements in accordance with the selected measurement bandwidth.

The indicated bandwidth can be an allowed measurement bandwidth or a serving cell bandwidth. Likewise, the determined minimum measurement bandwidth can be a fixed value when the indicated bandwidth is below a predetermined value. The predetermined value can be received by the receiving means over an air interface. The determined minimum measurement bandwidth can be a second predetermined value when the indicated bandwidth is above the predetermined value. Moreover, the second predetermined value can be received by the receiving means over an air interface.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

UE user equipment
BW bandwidth
HO handover
NW network
RSRQ reference signal received quality
RSSI received signal strength indicator
RSRP reference symbol received power
E-UTRAN Evolved UTRAN
PRB physical resource block
CRS common reference symbol

We claim:

1. A method, comprising:
   determining an allowed measurement bandwidth;
   determining, when the allowed measurement bandwidth exceeds a predetermined threshold, the presence of a network indication;
   determining, upon the presence of the network indication, a first predefined minimum measurement bandwidth;
   determining, when the allowed measurement bandwidth does not exceed a predetermined threshold, a second predefined minimum measurement bandwidth lower than the first predefined minimum measurement bandwidth;
   determining a first measurement bandwidth in the range between the determined first predefined minimum measurement bandwidth or the second predefined minimum measurement bandwidth and the allowed measurement bandwidth; and
   measuring a reference signal received quality (RSRQ) measurements in over the determined first measurement bandwidth.

2. The method of claim 1, wherein the second predefined minimum measurement bandwidth comprises a fixed value.

3. The method of claim 2, wherein the fixed value comprises six physical resource blocks.

4. The method of claim 1, wherein the determining the allowed measurement bandwidth comprises receiving a value over an air interface.

5. The method of claim 1, wherein the determining the presence of the network indication comprises receiving the network indication over an air interface.

6. An apparatus, comprising:
   at least one processor; and
   at least one memory including computer program code,
   wherein the at least one memory and the computer program code are configured to, with the at least one processor, cause the apparatus at least to determine an allowed measurement bandwidth;

determine, when the allowed measurement bandwidth exceeds a predetermined threshold, the presence of a network indication;

determine, upon the presence of the network indication, a first predefined minimum measurement bandwidth;

determine, when the allowed measurement bandwidth does not exceed a predetermined threshold, a second predefined minimum measurement bandwidth lower than the first predefined minimum measurement bandwidth;

determine a first measurement bandwidth in the range between the determined first predefined minimum measurement bandwidth or the second predefined minimum measurement bandwidth and the allowed measurement bandwidth; and measure a reference signal received quality (RSRQ) over the determined first measurement bandwidth.

7. The apparatus of claim 6, wherein the second predefined minimum measurement bandwidth comprises a fixed value.

8. The apparatus of claim 7, wherein the fixed value comprises six physical resource blocks.

9. The apparatus of claim 6, wherein the at least one memory and the computer program code are configured to, with the at least one processor, cause the apparatus at least to determine the allowed measurement bandwidth based on receiving a value over an air interface.

10. The apparatus of claim 6, wherein the at least one memory and the computer program code are configured to, with the at least one processor, cause the apparatus at least to determine the presence of the network indication based on receiving the network indication over an air interface.

11. The apparatus of claim 6, wherein the apparatus comprises a user equipment comprising at least one antenna.

* * * * *